United States Patent [19]

Cullum et al.

[11] 4,346,418
[45] Aug. 24, 1982

[54] HIGH DENSITY MULTITRACK MAGNETIC HEAD

[75] Inventors: Dennis F. Cullum, Leucadia; Jelmer Dorreboom, Olivenhain, both of Calif.

[73] Assignee: Spin Physics, Inc., San Diego, Calif.

[21] Appl. No.: 184,553

[22] Filed: Sep. 5, 1980

[51] Int. Cl.³ .......................... G11B 5/10; G11B 5/42; G11B 5/28; H01F 7/06
[52] U.S. Cl. .................................. 360/129; 29/603; 360/121
[58] Field of Search ............... 360/129, 121, 122, 120, 360/125; 29/603

[56] References Cited

U.S. PATENT DOCUMENTS 3,064,333 11/1962 Kristiansen et al. ............... 360/121
3,404,242 10/1968 Gridner ............................. 360/129
3,534,470 10/1970 Faure et al. ....................... 360/121
3,807,042 4/1974 Braitberg et al. .
3,843,968 10/1974 Kroon .
4,084,199 4/1978 Dorreboom .

FOREIGN PATENT DOCUMENTS 672601 10/1963 Canada ............................. 360/129

*Primary Examiner*—Alfred H. Eddleman
*Attorney, Agent, or Firm*—Robert F. Cody

[57] ABSTRACT

A method for making a multitrack head is disclosed wherein, by use of two separate alignment structures, a head having a large number of perfectly aligned cores, with perfect track-to-track spacing, is provided. The described multitrack head, by virtue of the inventive alignment technique, acquires a plurality of lead-protecting channels, the leads which are associated with the head coils being carried through such channels.

13 Claims, 9 Drawing Figures

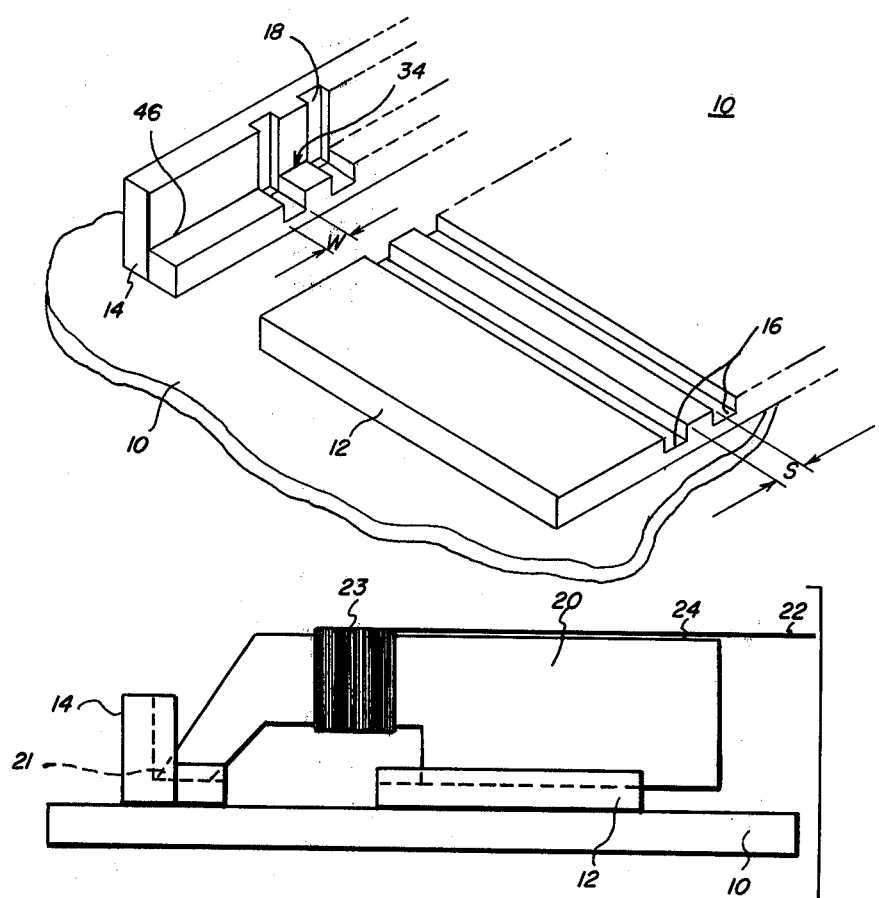
FIG. 1
FIG. 2
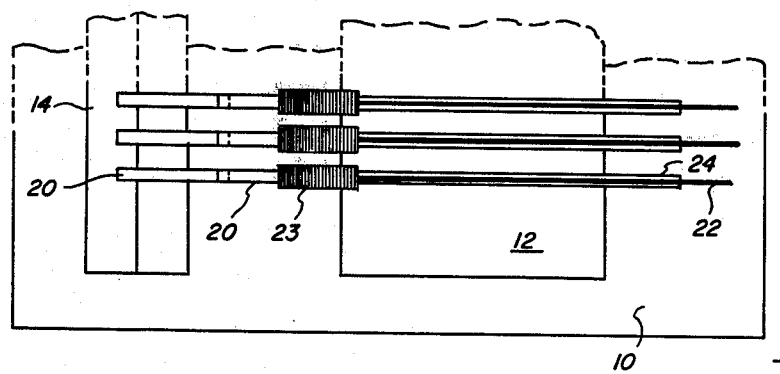

HIGH DENSITY MULTITRACK MAGNETIC HEAD

BACKGROUND OF THE INVENTION

(1) Field of the Invention

This invention relates in general to multitrack magnetic heads and to their methods of manufacture, and in particular to a multitrack magnetic head of the type in which the discrete cores thereof—and magnetic shields between the cores—are contained within a bracket or similar structure. The method for making a multitrack head according to the invention allows for a high density of cores across the widthwise dimension of the head and, as a result of such inventive method, the resulting head structure embraces a number of novel, distinguishing, and desirable characteristics.

(2) Description Relative to the Prior Art

Before addressing the relevant prior art, it is considered appropriate to address first what is clearly not the art over which the present invention provides an improved manufacturing method and multitrack head structure: The invention has nothing to do with multitrack heads of the type in which head structures are formed by vapor deposition (or the like) with, or without, the use of photofabrication procedures. Rather, the art over which the invention provides improvement relates to relatively conventional multitrack magnetic heads in which discrete cores and magnetic shields are preformed and then housed within an enclosing and/or supporting bracket.

Although there are many and varied multitrack heads, and manufacturing methods, over which the invention provides improvement, detailed reference is made to only one such prior art head and method, thereby to identify a particular problem solved by means of the invention. The prior art multitrack head in question is described in U.S. Pat. No. 3,807,042, issued Apr. 30, 1974 to Honeywell Inc. of Minneapolis, Minnesota. Referring therefore to U.S. Pat. No. '042, and in particular to FIGS. 8-11 thereof, it is seen that a supporting block 14 is provided with deep slots 15 and with shallow slots 16. Preformed core pieces 20, which are pre-wound with coils 24, are dropped into the shallow slots 16, and magnetic shields 18, 19 are dropped into the deep slots 15. Thereafter the head of U.S. Pat. No. '042 is completed by procedures which do not involve relevant prior art background for the invention; and thus, no further discussion is had as to those procedures. Careful note, however, should be made that in FIG. 11 of U.S. Pat. No. '042, the core pieces 20, as well as the magnetic shields 18, 19, respectively, extend completely into the bracket slots 16, 15. This sort of design represents the current state of the art.

The Problem

Whereas U.S. Pat. No. '042 discloses a multitrack head of just three tracks (the head widthwise dimension is not specified), consider the application of the procedure of U.S. Pat. No. '042 to the manufacture of a head having as many as 34 tracks per widthwise inch, wherein the track dimensions (core width) are (a narrow) ten mils, and wherein the shields have thicknesses of (as little as) 17 mils. Such being the case, this means that there are $$34 \times 0.010'' = 0.34'' \text{ plus}$$

$$33 \times 0.017 = 0.561'',$$

for a total of 0.901 widthwise inches of block 14 of U.S. Pat. No. '042 head that would have to be removed by slots to accommodate the core pieces and shields. This leaves just 0.099 widthwide inches out of which 68 precision slot-defining wall members would have to be fabricated. Given that each wall member is, for example, identically sized, this would mean that each wall member would have to be about $0.099/68 = 0.00145$ inches thick. At the current state of the art, it is absolutely impossible to cut 34 ten mil precision slots and 33 seventeen mil precision slots in a one inch block, with each slot separated by a precise fin-like wall member of only 0.00145 inches thick. By means of the invention, however, a multitrack head having 34 tracks (0.010" track width) per widthwise inch, with shields between the tracks (shield thickness 0.017"), is indeed provided.

Other prior art relevant to the invention may be found in the following: U.S. Pat. Nos. 3,593,414; 3,668,775; 3,761,641; 3,842,494; 3,843,968; 3,851,375; and 4,084,199.

SUMMARY OF THE INVENTION

The concept of the invention is to split the prior art practice of providing a single grouping of slots in a single member into two separate groupings of slots . . . the first slot grouping being within a support or bracket for a head according to the invention, and the second grouping being in a precision jig that is separable from the head during its manufacture. The first slot grouping is disposed to accept and align the head shields; and the second slot grouping is disposed to accept and align the head cores.

As a result of using two separate aligning and/or supporting groupings of slots, not only is the manufacture of a head with as many as 34 tracks per widthwise inch possible, but such cores may be appropriately dimensioned so as to provide channels (between the shield support and the cores) through which the core coil leads may be handily drawn for connection to using apparatus. Particular attention will be drawn to this feature in the description which follows; and such description is made with reference to FIGS. 1-8, of which FIG. 1 is a perspective view of a jig useful in practicing the invention;

FIG. 2 comprises plan and side elevational views of head cores mounted in the jig of FIG. 1;

FIG. 3 comprises views like those of FIG. 2 but showing the interleaving of shields with jig supported cores;

Figure 3:
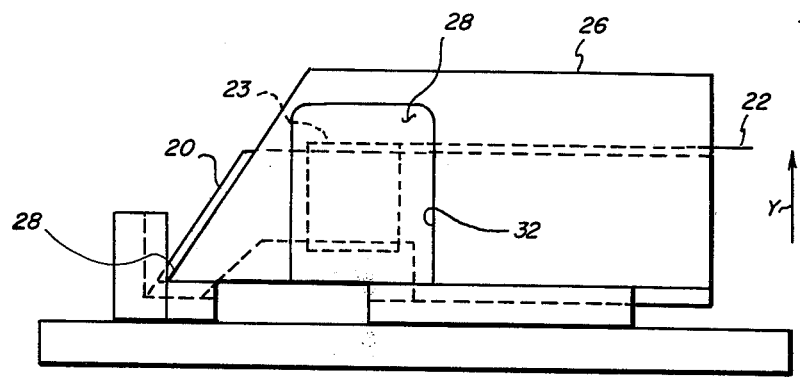
Figure 3:
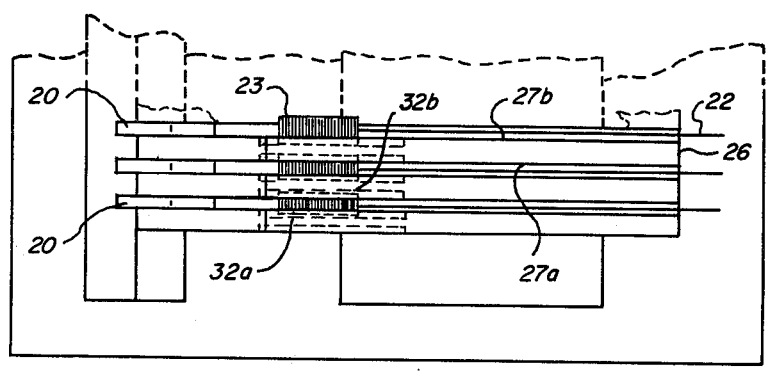

A multitrack head according to the invention will be described with reference to its inventive method of manufacture:

Referring to FIG. 1, a jig 10 is shown having a pair of alignment structures 12, 14. The alignment structure 12 is provided with a set of uniformly distributed slots 16 (i.e. a first slot grouping); and the alignment structure 14 is provided with uniformly distributed L-shaped recesses 18 which are as wide as, and are aligned with, the slots 16. In the fabrication of a 34 track (per widthwise inch) head according to the invention, the slot dimension W in FIG. 1 is equal to 0.015", and the space between the slots is 0.0185".

Reference should now be had to the plan and side elevational views of FIG. 2. Pre-wound core pieces 20 (thickness 0.0100") are set into the slots 16, the tips 21 of the core pieces extending into the L-shaped recesses 18 and abutting against the structure 14. Importantly, note should be made that leads 22, associated with coils 23 which are pre-wound on the core pieces 20, are drawn along the edge 24 of the core pieces 20 toward the right in FIG. 2.

Next (see FIG. 3), shield members 26 are set between each pair of adjacent core pieces 20. The shield members 26 are comprised of a pair of copper laminae 27a, b which sandwich a stack of high-mu laminae 28, the copper laminae 27a, b being provided with U-shaped cutouts 32 which reveal the high-mu laminae 29 and, in so doing, provide recesses 32a, b for accommodating the widthwise dimensions of the coils 23. The tips 28 of the shield members 26 are positioned so as to abut against the unrecessed corners 34 (FIG. 1) of the structure 14; and, importantly, the shields 26 are wider (i.e. in the direction of the arrow Y) than the core pieces 20.

Figure 4A:
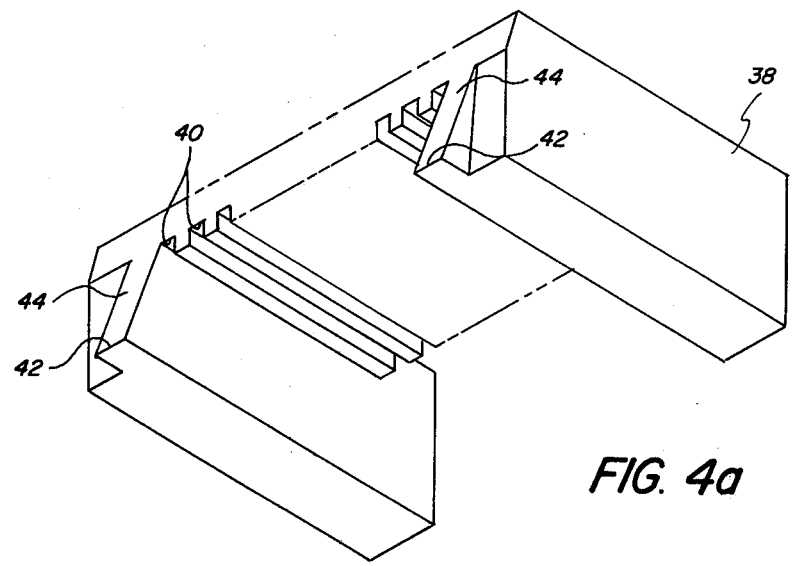
FIGS. 4a and 4b are, respectively, a perspective view of a bracket assembly useful in the practice of the invention, and a view illustrating the cooperation between the bracket assembly and the jig supported cores with interleaved shields.

A bracket assembly 38 (see FIG. 4a) having a set of slots 40 (i.e. a second slot grouping) which are 0.0185" wide—and which slots have the same pitch as the shield members 26 that are interleaved with the core pieces 20—is then placed over the assembly of FIG. 3, the upwardly extending shield members 26 fitting snugly into the slots 40 of the bracket assembly 38. The slots 40 of the bracket assembly 38 are pre-coated with epoxy or other cement and, as the shield members 26 are set into the slots 40, the bracket assembly tips 42 of its contour faces 44 are brought into abutting relationship with the corners 46 of the structure 14. See FIGS. 1 and 4b. Since the core pieces 20 are not as wide (in the direction Y; FIG. 3) as the shield members 26, channels 48 are formed between the core pieces 20 and the bracket assembly 38 . . . and such channels 48 inherently result from a fabrication procedure that splits core piece alignment from shield member alignment. It is through the channels 48 that the coil leads 22 are brought for connection to using apparatus.

Figure 4B:
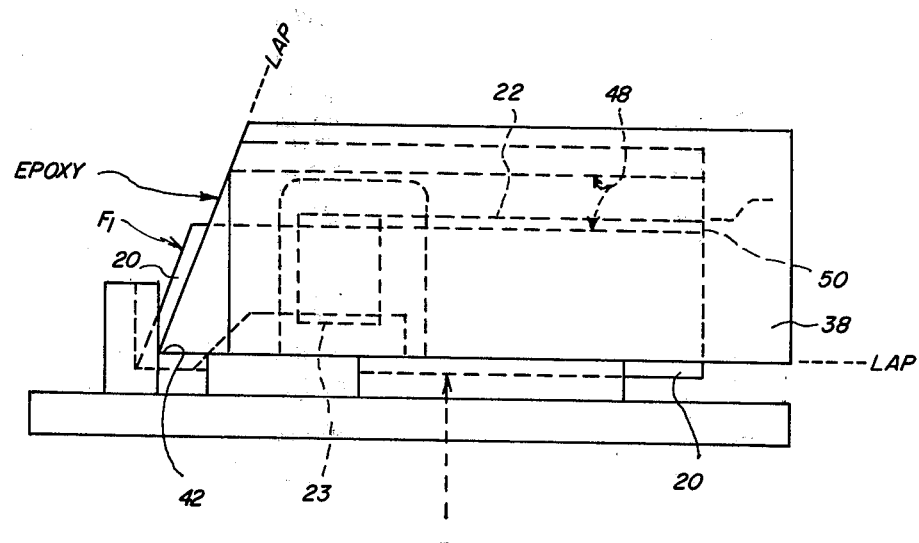

Epoxy, or other cement, is then squirted into the channels 48 (and other voids) by means, for example, of a hypodermic needle, after which the whole assembly of FIG. 4b is set in an oven to cure the cement that bonds the shield members 26 to the bracket assembly 38, and the core pieces 20 to the shield members 26. Such application of epoxy into the channels 48 also serves to anchor the leads 22 so that they cannot be broken anywhere between the coils 23 and where they exit (50) the channels 48.

Figure 5:
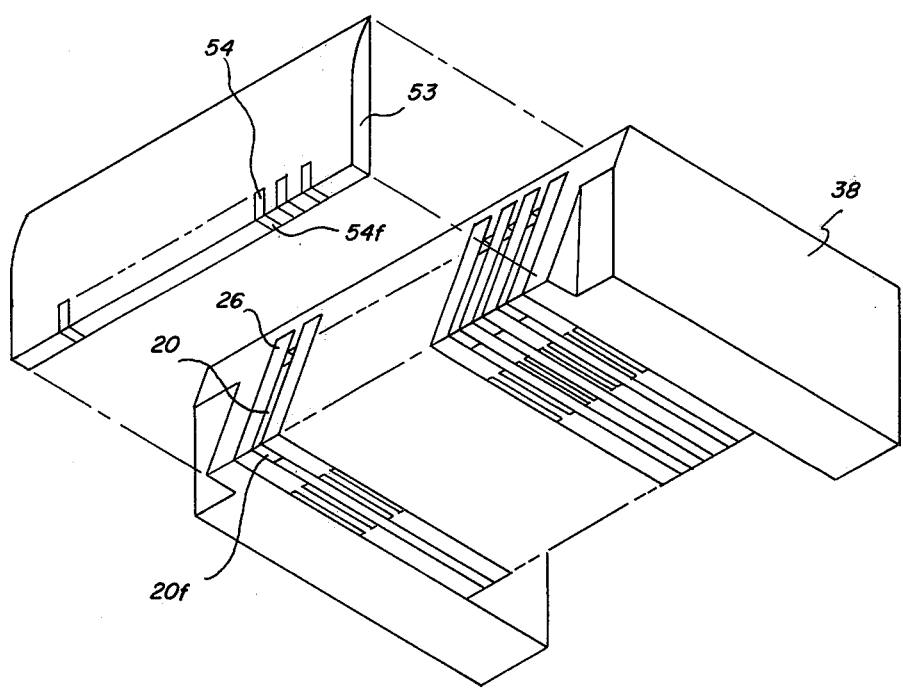
FIGS. 5-7 are perspective views illustrating successive procedures in the practice of the invention.

With the parts 20, 26, 38 all bonded together, the structure of FIG. 4b is lifted free of the jig 10. (Thus, one of the two groupings of slots is effectively discarded—but used again—the parts which it had held being thereafter held in precise track-to-track positions by the cured epoxy.) A pole tip plate 53 (see FIG. 5) having high mu, wear resistant pole tip regions 54 of, for example, Alfesil, is then bonded to the core and shield assembly, with the pole tip regions 54 being in low reluctance contact with respective core pieces 20. Because the core pieces 20 had resided in jig slots 16, 18, whereas the shield members 26 had not, the faces $F_1$ and $F_2$ (FIG. 4b) of the integral structure are serrated; and such serrations are removed by lapping (extremely flat) as noted by the two lap lines of FIG. 4b. Note again should be taken that despite the precise positioning of the core pieces 20, such core pieces do not reside in any bracket assembly (38) slots.

(It will be appreciated that, for a variety of reasons, it is impossible to align shield members in the jig slots, and core pieces in bracket slots, and still produce an operative, efficient, and useful head structure.)

Figure 6:
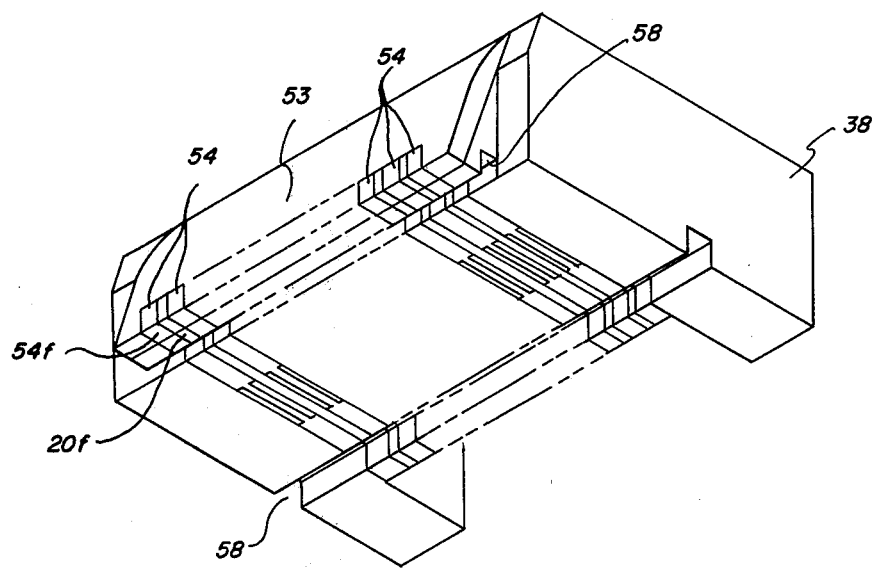
Figure 7:
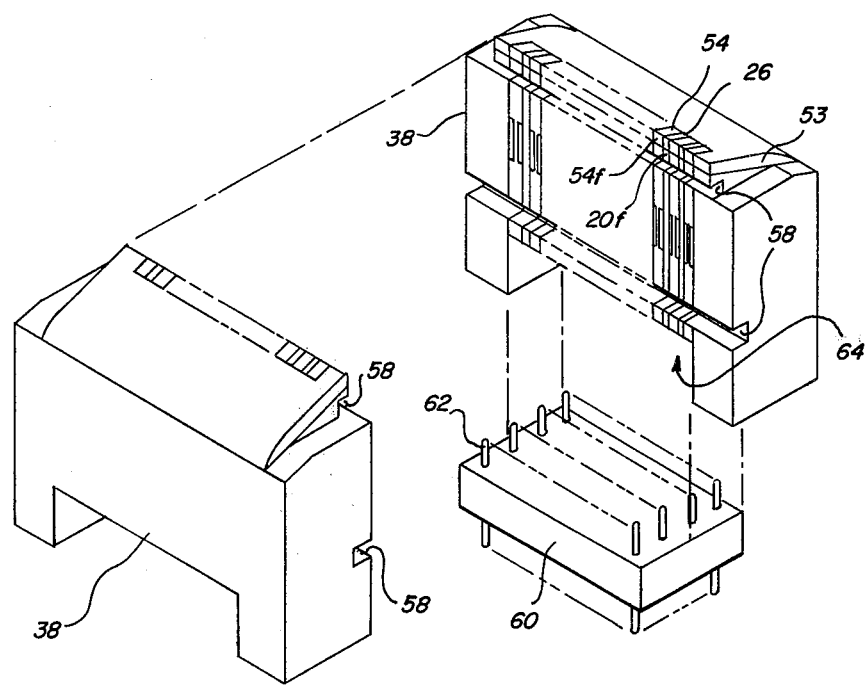
Figure 8:
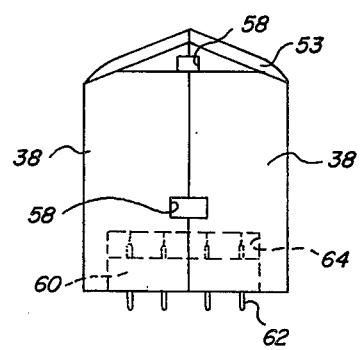
FIG. 8 is a side elevational view depicting a magnetic head according to the invention.

Now, a multitrack magnetic head in accordance with the invention is finished/assembled according to practices well known in the art:

(1) channels 58 are cut (FIG. 6) in the core and shield assembly, (2) gap spacing material is deposited on the faces $54_f$ of the pole tips 54, and on the "front" face parts $20_f$ of the core pieces 20, (3) a second core and shield assembly, just like the core and shield assembly of FIG. 6, is brought into abutting relationships with the first core and shield assembly, corresponding pole tips 54 and shield members 26 of the two assemblies being in alignment (see FIGS. 7, 8), (4) with the core and shield assemblies held in close contact, glass, or other bonding material, is set into the channels 58, thereby to bond the core and shield assemblies together, (5) a contact panel 60 having a plurality of pins 62 is set (by suitable means) into a back cavity 64 that is formed when the two core and shield assemblies are bonded together, the contact panel 60 serving as an output connector for the coil leads 22 which are drawn through the channels 48 (FIG. 4b).

The invention has been described in detail with particular reference to preferred embodiments thereof, but it will be understood that variations and modifications can be effected within the spirit and scope of the invention. For example, whereas the above description has dwelled on the fabrication of a multitrack head having 34 ten mil tracks per widthwise inch, heads of differing numbers and densities or cores, and core widths, are within the contemplation of the invention.

What is claimed is:

1. The method of assembling part of a multitrack magnetic head having about 30 or more tracks per widthwise inch, said method comprising the steps of
(a) setting a plurality of core pieces in aligned slots of a slotted jig, the core pieces being narrower than a first dimension Y,
(b) setting magnetic shield members between respective pairs of said core pieces, thereby to form an interleaved assembly of shield members and core pieces, said shield members being wider than said dimension Y and being disposed to reside against the shoulders of respective jig slots, whereby the parts of said shield members which do not abut against said shoulders extend away from said interleaved assembly of core pieces and shield members,
(c) embracing said interleaved assembly of core pieces and shield members within a slotted bracket assembly so that the extended parts of said shield members reside in respective slots of said bracket assembly,
(d) bonding said bracket assembly, said shield members, and said core pieces together while said core pieces reside in said jig slots, and (e) after said bonding, removing said core pieces from the slots of said jig, whereby those parts of said core pieces which had resided in said jig slots may be lapped away or otherwise removed from said bonded parts.

2. The method of assembling part of a multitrack magnetic head having about 30 or more tracks per widthwise inch, said method comprising the steps of (a) setting a plurality of core pieces which are respectively pre-wound with coils in aligned slots of a slotted jig, the core pieces being narrower than a first dimension Y, (b) setting magnetic shield members between respective pairs of core pieces, thereby to form an interleaved assembly of shield members and core pieces, said shield members being wider than said dimension Y and being disposed to reside against the shoulders of respective jig slots, whereby the parts of said shield members which do not abut against said shoulders extend away from said interleaved assembly of shield members and core pieces, (c) embracing said interleaved assembly of shield members and core pieces within a slotted bracket assembly so that (1) the extended parts of said shield members reside in respective slots of said bracket assembly and (2) channels are formed between said core pieces and the shoulders of said bracket assembly slots, (d) withdrawing the leads of said core piece coils respectively through said channels, (e) bonding said bracket assembly, said shield members, said core pieces, and said coils and coil leads into an integral assembly while said core pieces reside in said jig slots, and (f) after said bonding, removing said core pieces from the slots of said jig, whereby those parts of said core pieces which had resided in said jig slots may be lapped away or otherwise removed from said bonded parts.

3. The method of claim 2 wherein said shield members are provided with generally U-shaped recesses and wherein, when said shield members are interleaved with said core pieces, said pre-wound coils of said core pieces at least partially reside within corresponding recesses.

4. The method of making a multitrack magnetic head having about 30 or more tracks per widthwise inch, said method comprising the steps of (a) setting a plurality of core pieces, which are respectively pre-wound with coils, in aligned slots of a slotted jig, the core pieces being narrower than a first dimension Y, (b) setting magnetic shield members between respective pairs of said core pieces, thereby to form an interleaved assembly of shield members and core pieces, said shield members being wider than said dimension Y and being disposed to reside against the shoulders of respective jig slots, (c) embracing said interleaved assembly of shield members and core pieces within a slotted bracket assembly so that (1) the extended parts of said shield members reside in respective slots of said bracket assembly and (2) channels are formed between said core pieces and the shoulders of said bracket assembly slots, (d) withdrawing the leads of said core piece coils respectively through said channels, (e) bonding said bracket assembly, said shield members, said core pieces, and said coils and coil leads into an integral assembly while said core pieces reside in said jig slots, (f) after said bonding, removing said core pieces from the slots of said jig, (g) after said removal, lapping or otherwise cutting away those parts of said core pieces which had resided in said jig slots, and (h) bonding said integral assembly to a magnetic structure with a non-magnetic gapping material therebetween.

5. The method of claim 4 wherein said shield members are provided with generally U-shaped recesses and wherein, when said shield members are interleaved with said core pieces, said pre-wound coils of said core pieces at least partially reside within corresponding recesses.

6. The method of making a multitrack magnetic head having about 30 or more tracks per widthwise inch, said method comprising the steps of (a) forming first and second substantially identical parts, each part being formed by (1) setting a plurality of core pieces which are respectively pre-wound with coils in aligned slots of a slotted jig, the core pieces being narrower than a first dimension Y, (2) setting magnetic shield members between respective pairs of said core pieces, thereby to form an interleaved assembly of shield members and core pieces, said shield members being wider than said dimension Y and being disposed to reside against the shoulders of respective jig slots, whereby the parts of said shield members which do not abut against said shoulders extend away from said interleaved assembly of shield members and core pieces, (3) embracing said interleaved assembly of shield members and core pieces within a slotted bracket assembly so that (1) the extended parts of said shield members reside in respective slots of said bracket assembly and (2) channels are formed between said core pieces and the shoulders of said bracket assembly slots, (4) withdrawing the leads of said core piece coils respectively through said channels, (5) bonding said bracket assembly, said shield members, said core pieces, and said coils and coil leads into an integral assembly while said core pieces reside in said jig slots, (6) after said bonding, removing said core pieces from the slots of said jig, and (7) after said removal, lapping or otherwise cutting away those parts of said core pieces which had resided in said jig slots, (b) bonding together said first and second parts with non-magnetic gapping material therebetween, and (c) connecting the leads which are withdrawn through said channels to respective contacts of a connector.

7. The method of claim 6 wherein said shield members are provided with generally U-shaped recesses and wherein, when said shield members are interleaved with said core pieces, said pre-wound coils of said core pieces at least partially reside within corresponding recesses.

8. A bracketed core and shield assembly for use in a multitrack magnetic head having about 30 or more tracks per widthwise inch comprising (a) a slotted bracket, (b) a set of shield members extending from and being respectively bonded within the slots of said bracket, (c) a set of core pieces bonded to and interleaved with said shield members without touching the shoulders of the slots in said bracket, whereby channels are formed between said core pieces and said bracket, and (d) coils wound on said core pieces, the leads of said coils extending through said channels for connection to using apparatus.

9. The assembly of claim 8 wherein (a) said shield members are provided with generally U-shaped recesses therein and (b) respective core piece coils are embraced by and extended to within said recesses.

10. A multitrack magnetic head having about 30 or more tracks per widthwise inch comprising (a) a bracketed core and shield assembly, (b) gapping material, and (c) magnetic means bonded to said core and shield assembly with said gapping material therebetween, said bracketed core and shield assembly comprising (a) a slotted bracket, (b) a set of shield members extending from and being respectively bonded within the slots of said bracket, (c) a set of core pieces bonded to and interleaved with said shield members without touching the shoulders of the slots in said bracket, whereby channels are formed between said core pieces and said bracket, and (d) coils wound on said core pieces, the leads of said coils extending through said channels for connection to using apparatus.

11. The multitrack head of claim 10

(a) wherein the shield members of said bracketed core and shield assembly are provided with generally U-shaped recesses therein and (b) the coils which are wound on said core pieces are embraced by and extended to within said recesses.

12. The multitrack magnetic head of claim 10 wherein said magnetic means bonded to said core and shield assembly is a second core and shield assembly, the respective core pieces and shield members thereof being in alignment with corresponding core pieces and shield members of the first core and shield assembly.

13. The multitrack magnetic head of claim 12 wherein (a) said shield members of both said core and shield assemblies have generally U-shaped recesses therein and (b) respective core piece coils are embraced by and extended to within said recesses.

* * * * *